(12) United States Patent
Goma et al.

(10) Patent No.: US 7,571,271 B2
(45) Date of Patent: Aug. 4, 2009

(54) LANE MERGING

(75) Inventors: Sergiu Goma, Markham (CA); Fariborz Pourbigharaz, Markham (CA); Milivoje Aleksic, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 9 days.

(21) Appl. No.: 11/536,365

(22) Filed: Sep. 28, 2006

(65) Prior Publication Data

US 2007/0079047 A1 Apr. 5, 2007

Related U.S. Application Data

(60) Provisional application No. 60/721,255, filed on Sep. 28, 2005.

(51) Int. Cl.
*G06F 13/36* (2006.01)
*G06F 5/00* (2006.01)
*G06F 1/32* (2006.01)

(52) U.S. Cl. .................... 710/310; 710/51; 713/320
(58) Field of Classification Search .............. 710/51, 710/310; 713/320
See application file for complete search history.

(56) References Cited

U.S. PATENT DOCUMENTS

| | | | |
|---|---|---|---|
| 6,363,023 B2 | 3/2002 | Andersen et al. | |
| 6,560,240 B1 | 5/2003 | Borland et al. | |
| 6,594,714 B1 * | 7/2003 | Swanson et al. | 710/51 |
| 6,697,383 B1 * | 2/2004 | Li et al. | 370/510 |
| 6,738,068 B2 * | 5/2004 | Cohen et al. | 345/519 |
| 6,760,349 B1 | 7/2004 | Ho et al. | |
| 6,886,058 B2 * | 4/2005 | Haren | 710/65 |
| 6,907,534 B2 * | 6/2005 | Ku | 713/320 |
| 6,993,667 B1 * | 1/2006 | Lo | 713/320 |
| 7,136,953 B1 * | 11/2006 | Bisson et al. | 710/307 |
| 7,188,263 B1 * | 3/2007 | Rubinstein et al. | 713/300 |
| 7,200,186 B2 | 4/2007 | Schoenborn | |
| 7,203,853 B2 | 4/2007 | Martwick et al. | |
| 7,283,520 B1 * | 10/2007 | Liao et al. | 370/357 |
| 7,409,567 B2 * | 8/2008 | Hammes et al. | 713/320 |
| 2002/0085415 A1 | 7/2002 | Baltar | |
| 2005/0078673 A1 * | 4/2005 | Sakamoto et al. | 370/389 |
| 2005/0078712 A1 | 4/2005 | Voutilainen | |
| 2005/0238055 A1 | 10/2005 | Frodsham et al. | |
| 2006/0013207 A1 * | 1/2006 | McMillen et al. | 370/388 |
| 2006/0023633 A1 | 2/2006 | Caruk et al. | |
| 2006/0294279 A1 * | 12/2006 | McKee et al. | 710/301 |
| 2007/0067548 A1 * | 3/2007 | Juenger | 710/315 |
| 2007/0294458 A1 * | 12/2007 | Danilak | 710/313 |

OTHER PUBLICATIONS

Bhatt, Ajay V.; Creating a Third Generation I/O Interconnect; Desktop Architecture Labs, Intel Corporation; from www.express-lane.org; pp. 1-11.

* cited by examiner

*Primary Examiner*—Khanh Dang
*Assistant Examiner*—Christopher A Daley
(74) *Attorney, Agent, or Firm*—Vedder Price P.C.

(57) ABSTRACT

A buffer is associated with each of a plurality of data lanes of a multi-lane serial data bus. Data words are timed through the buffers of active ones of the data lanes. Words timed through buffers of active data lanes are merged onto a parallel bus such that data words from each of the active data lanes are merged onto the parallel bus in a pre-defined repeating sequence of data lanes. This approach allows other, non-active, data lanes to remain in a power conservation state.

18 Claims, 3 Drawing Sheets

LANE MERGING

CROSS-REFERENCE TO RELATED APPLICATION

The present application claims the benefit of prior provisional application Ser. No. 60/721,255, filed Sep. 28, 2005, the contents of which are hereby incorporated herein by reference.

BACKGROUND

This invention relates to merging data words from a multi-lane serial bus to a parallel bus.

A system, such as a multiple integrated circuit (IC) device, may have both serial buses and parallel buses for the movement of data. Data may move along the buses in an asynchronous, "as required", fashion. In consequence, data throughput on the buses can be uneven and highly variable. A high variability in throughput can be particularly problematic in mobile battery powered systems, where providing capability for peak data transfer events can place a significant load on the battery.

This invention seeks to provide an improved manner of coping with uneven data throughput demands on a system having serial and parallel buses.

SUMMARY OF INVENTION

A buffer is associated with each of a plurality of data lanes of a multi-lane serial data bus. Data words are timed through the buffers of active ones of the data lanes. Words timed through buffers of active data lanes are merged onto a parallel bus such that data words from each of the active data lanes are merged onto the parallel bus in a pre-defined repeating sequence of data lanes. This approach allows other, non-active, data lanes to remain in a power conservation state.

Other features and advantages of the invention will become apparent from the following description in conjunction with the drawings.

BRIEF DESCRIPTION OF THE DRAWINGS

In the figures which illustrate example embodiments of the invention.

DETAILED DESCRIPTION

Data moving through a system asynchronously is typically transmitted as data packets. A data packet typically has a packet header followed by payload data. In some systems, packets end with a packet footer. The packet header typically includes a destination address for the packet, and may also include other information. The data of the header, payload, and any footer is typically organized as data words, with each data word typically being a data byte, each byte comprising a fixed number of bits (for example, eight bits).

Figure 1:
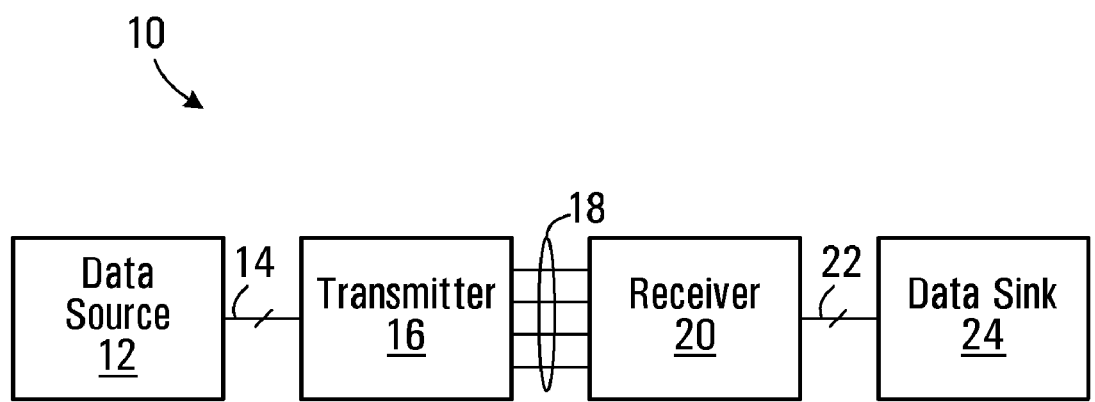
FIG. 1 is a schematic view of a system made in accordance with this invention.

Turning to FIG. 1, which illustrates an exemplary system 10 suited for use with this invention, a data source 12 is connected by a parallel bus 14 to a transmitter 16. The transmitter is connected by a multi-lane serial bus 18 to a receiver 20 and the receiver is connected by a parallel bus 22 to a data sink 24. Data may move through system 10 as data words organized into data packets. Each of parallel buses 14 and 22 may move one data word in parallel fashion in one clock cycle. Each lane of serial bus 18 may move one bit in one clock cycle (though the clock may be of a significantly higher speed than the clock of the parallel buses).

Figure 2:
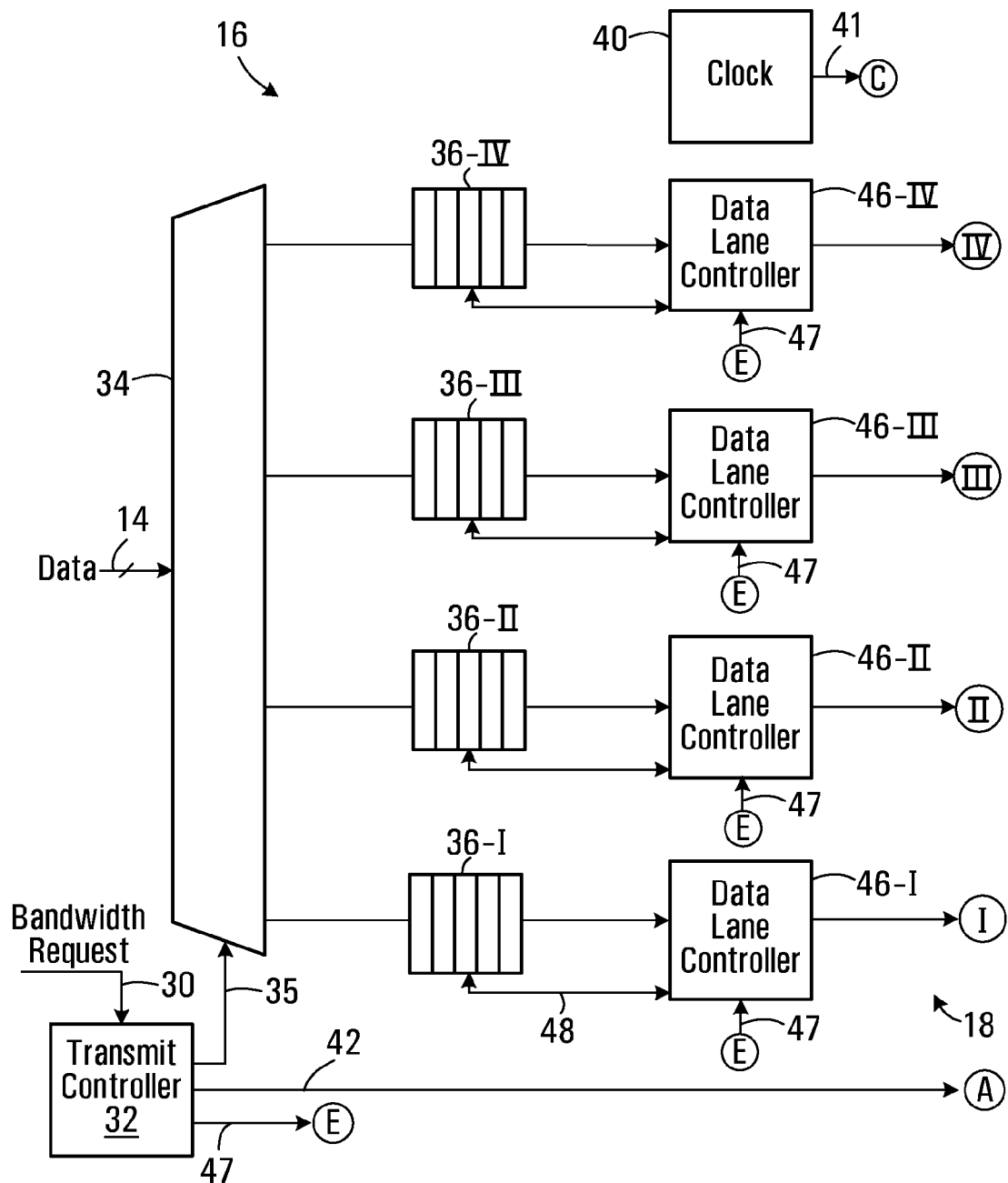
FIG. 2 is a detailed schematic view of the transmitter of FIG. 1.

Transmitter 16 is detailed in FIG. 2. The transmitter comprises a lane distributor 34 input by parallel data bus 14 and which outputs to each of four FIFO buffers 36-I, 36-II, 36-III, and 36-IV, collectively referred to as buffers 36. Each of the buffers 36 outputs to one of four data lane controllers 46 (specifically, respective ones of data lane controllers 46-I, 46-II, 46-III, and 46-IV). Each buffer 36 is also connected to its data lane controller 46 through a control path 48. Each of the data lane controllers 46 outputs to one of the data lanes I, II, III, or IV of multi-lane serial bus 18. A clock 40 outputs a clock signal to the active components of the transmitter and also outputs a clock signal on clock lane 41 to the receiver. A transmit controller 32 is connected to an output of a bandwidth request path 30 and has a control output on path 35 to lane distributor 34, a control output on path 47 to each of the data lane controllers, and a control output on path 42 to the receiver. Path 42 could be, for example, an I$^2$C bus or simply a two bit line.

Figure 3:
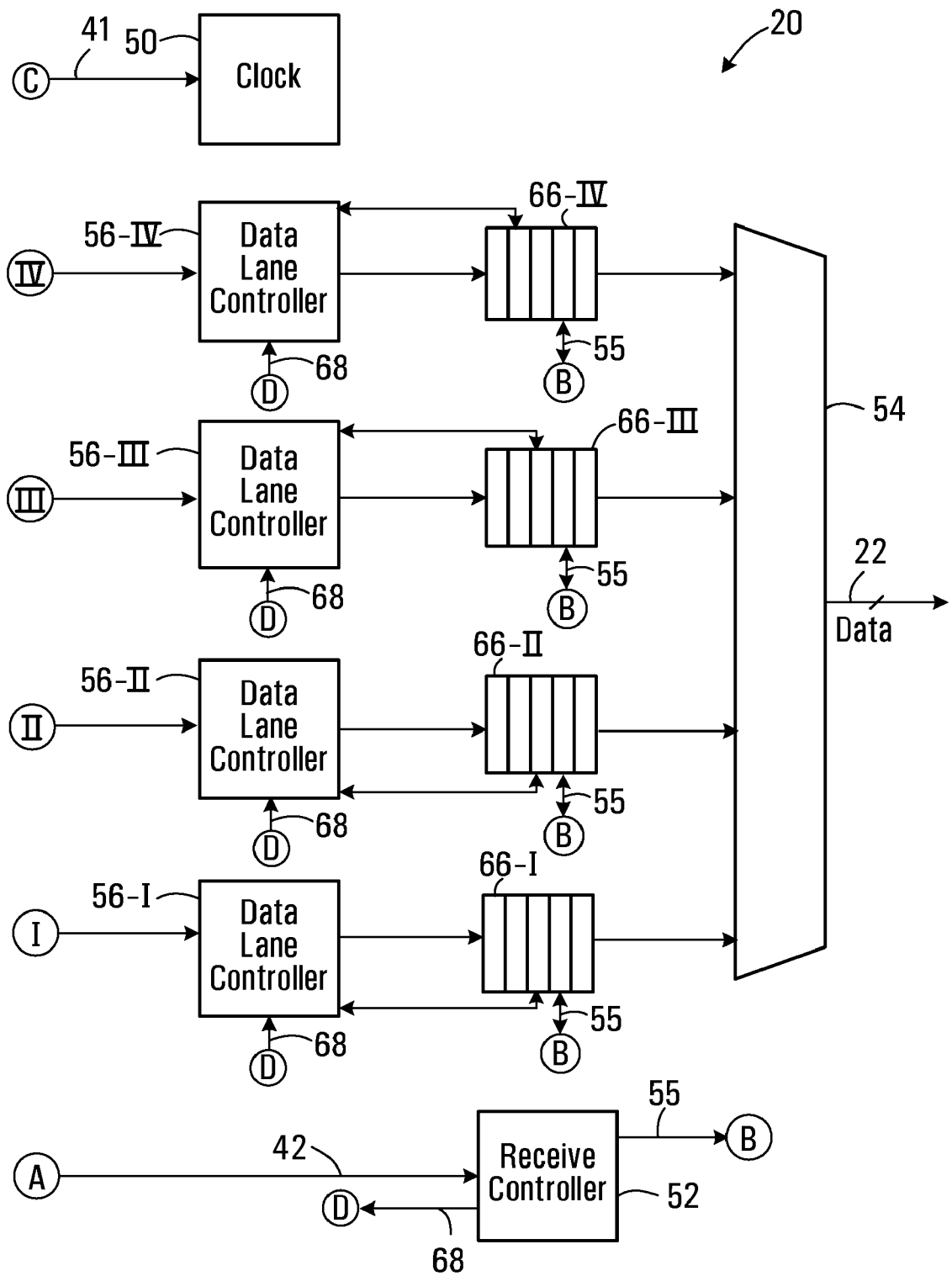
FIG. 3 is a detailed schematic view of the receiver of FIG. 1.

Receiver 20 is detailed in FIG. 3. The receiver comprises a clock 50 which receives a clock signal from the clock of the transmitter and data lane controllers 56 which each terminate one of data lanes I, II, III, or IV. The data lane controllers 56 output to receive FIFO buffers 66. The receive buffers are also connected to their respective data lane controller on a control path 58. The buffers 66 output to a lane merger 54 which, in turn, outputs to parallel bus 22. A receive controller 52 receives a signal on path 42 from the transmit controller. The receive controller is connected for two-way communication with the data lane controllers on path 68 and with buffers 66 on path 55.

In a quiescent state, each of the data lane controllers 46 and 56 may be in a power conservation state.

In operation, referencing FIG. 2, when the data source wishes to send data packets from parallel bus 14 over multi-lane serial bus 18 to the data sink 24, it transmits a bandwidth request on line 30 to transmit controller 32 of the transmitter 16. Based on this request, the transmit controller decides which data lanes of multi-lane serial bus 18 to use. To make these chosen data lanes active data lanes, the transmit controller signals the data lane controller 46 associated with each of the chosen data lanes on control path 47 in order to awaken these data lane controllers from a power conservation state. Data words then begin arriving at the lane distributor, one parallel data word at a time. The transmit controller controls lane distributor 34 via control path 35 so that it sends the arriving data words to the FIFO buffers 36 of the chosen data lanes in a cyclical pattern. The data word sent to each active lane may be a byte of data. Thus, the transmit controller handles each packet in a byte-wise fashion, such that a packet is decomposed into its constituent bytes for transmission. Conveniently, the transmit controller may be arranged to choose data lane I as the sole active data lane for the lowest bandwidth requests, data lanes I and II for somewhat higher bandwidth requests, data lanes I, II, and III for bandwidth requests which are higher still and data lanes I, II, III, and IV for the highest bandwidth requests. Conveniently, as illustrated in the example embodiment, each data lane is associated with an ordinal indicator (namely I, II, III, and IV in the example embodiment). In such case, the cyclical pattern may be chosen as an ascending sequence of ordinal indicators of active data lanes. Data bytes are then sent to the active data lanes in this repeating ascending sequence. Thus, for example, where data lanes I, II, and III are chosen as the active data lanes, the first data byte in a transmission is sent to lane I, the second byte to lane II, the third byte to lane III, the fourth to lane I, and so on. If the first packet of the transmission is four bytes long, this means that the first and fourth bytes of the first packet end up on lane I, whereas the second and third bytes of the packet end up on lanes II and III, respectively. It will be appreciated that a transmission will comprise one or more variable length back-to-back packets. After the transmit controller distributes the last byte in a given transmission to a data lane, it signals the data lane controller for that data lane on path 47 to inject an end of transmission indicator onto the lane and subsequently signals the data lane controller to return to its power conservation state. Thus, each active data lane will transmit an end of transmission indicator after the last byte of the transmission on that data lane has been transmitted. The end of transmission indicator may be, for example, a string of logical 0s if the last bit of the last byte ended with a logical 1, and may be a string of logical 1s and if the last bit of this last byte ended with a logical 0. This series (of 1s or 0s) may continue until the data lane is returned to its quiescent state (by the transmit controller signalling each active data lane controller 46 on control path 47 to return to its power conservation state).

Clock 40 clocks the data bytes through the FIFO buffers 36. When the leading data byte in a FIFO buffer for a data lane reaches the head of the FIFO buffer, the FIFO buffer sends a transmit request to its associated data lane controller 46 on control path 48. The data lane controller 46 then returns a transmit acknowledge signal whereupon data bytes are clocked out of the FIFO buffer 36 to the data lane of the multi-lane serial bus 18.

It will be appreciated that due to the variability of the various devices in the system, there will be variability in the timing of the receipt of each transmit acknowledge signal such that the clock cycle during which a FIFO buffer 36 may begin clocking out data bytes to a data lane is not deterministic.

For example, it may be that data lanes I, II, and III are chosen as the active lanes for a data transmission. The transmit controller 32 therefore controls the lane distributor 34 to output the first data byte to buffer 36-I, the second byte to buffer 36-II, the third to buffer 36-III, and so on in repeating sequence. Since the data is timed through each of the buffers using the same clock, normally, the first data byte sent to buffer 36-I would be the first to arrive at the head of any of the buffers 36. Once this occurs, buffer 36-I sends a transmit request to data lane controller 46-I. Shortly thereafter, a first byte in buffer 36-II may arrive at the head of buffer 36-II and this buffer will then send a transmit request. Likely after a further short interval, a first byte in buffer 36-III may arrive at the head of buffer 36-III and this buffer will then send a transmit request. Due to inherent variability in the system, it may be that a transmit acknowledge signal is returned first by data lane controller 36-II, second by data lane controller 36-III, and lastly by data lane controller 36-I. As soon as a buffer receives the expected transmit acknowledge signal, it begins transmitting bytes to its lane via its data lane controller. Thus, pursuing this example, bytes first begin appearing on data lane II, then on data lane III, and lastly on data lane I.

Transmit controller 32 sends an indication of the active data lanes to the receiver on control path 42. Turning to FIG. 3, receive controller 52, on receiving this indication on path 42 may wake up the receive data lane controllers 56 for these data lanes with appropriate signals on control path 68. When a data byte arrives at a data lane controller 56, the data lane controller sends a data received signal to its associated receive FIFO buffer 66 on control path 58 causing this buffer to begin clocking in data bytes under control of clock 50. When the first byte arrives at the head of the queue of a FIFO buffer 66, the buffer sends a signal to the receive controller 52 on control path 55, and waits. Once the receive controller receives a signal from the FIFO buffers of all active data lanes, it prompts the buffers, on control path 55, to send bytes in a cyclical pattern to lane merger 54. The cyclical pattern used for dequeuing data bytes is the same as that used by the transmit controller to enqueue bytes. This pattern may be a characteristic of the system (i.e., permanently stored in the transmit and receive controllers) or an indication of the pattern to be used may be sent by the transmit controller to the receive controller 52.

Pursuing the foregoing example, likely a data byte on data lane II is the first to arrive at the head of any of the buffers. Once this data byte arrives at the head of buffer 66-II, buffer 66-II sends a ready signal to the receive controller 52. A first data byte on data lane III likely next arrives at the head of its buffer 66-III and buffer 66-III then sends a ready signal; lastly, a first data byte on lane I arrives at the head of its buffer 66-I. Once the receive controller 52 has received a ready signal from all active lanes, it first prompts buffer 66-I to send a byte to lane merger 54, then prompts buffer 66-II to send a byte to the lane merger, then prompts buffer 66-III to send a byte, then prompts buffer 66-I to send another byte, and so on such that the bytes outgoing from the receiver on parallel bus 22 (as one parallel data byte at a time) have the same order as those that arrived at the transmitter on parallel bus 14 (FIG. 2). Since the bytes are the constituents of packets, it follows that with the bytes leaving the receiver in correct order, the packets which are composed of these bytes are, in effect, re-assembled at the receiver.

In an alternate embodiment, the receive controller may not wait for a ready signal from the buffer of each of the active data lanes. Instead, as soon as it receives a ready signal from the buffer for a data lane which is next in the required cyclical pattern, it can prompt this buffer to send a data byte to the lane merger 54. For example, assuming again that data bytes are to be multiplexed in the repeating sequence of lanes I, II, III, and IV, and assuming data lanes I, II, III, and IV were active, then if buffer 66-II was the first to send a ready signal, the receive controller would log this but not respond. If buffer 66-I was the next to send a ready signal, then the receive controller could immediately prompt buffer 66-I to send a first data byte to the lane merger, and immediately thereafter prompt buffer 66-II to send a data byte to the lane merger, regardless of whether or not a ready signal had yet been received by the controller from buffer 66-III.

After the last data byte distributed to a particular data lane reaches a given receive data lane buffer 66, subsequent bytes will be segments of the end of transmission indicator inserted into the data lane at the transmitter. These end of transmission indicator bytes are passed to the lane merger. When the transmitter returns its data lanes to a low power state, it may signal the receiver controller 52 which may then place the active receiver data lane controllers 56 in a low power state. Alternatively, each active receive data controller could sense the transition of its data lane to a low power state and drop to a low power state.

When bytes clocked onto parallel bus 22 begin arriving at data sink 24, the sink needs some manner of parsing the bytes to identify the (variable length) packets in the byte stream. This may be accomplished in several ways. In a first approach, packets could be prepared at data source 12 so that each has a packet footer with a characteristic signature denoting the end of the packet. Alternatively, each packet header could have a characteristic signature so that a header may be recognised as such and this information used to identify the end of the preceding packet. Thirdly, the header of each packet could include a byte count indicative of the number of bytes in the payload (and any footer) of the packet. If system 10 operates in this third fashion, then when bytes begin arriving at data sink 24, the sink will know that the first bytes to arrive represent the header of the first packet and that a set of one or more bytes in a pre-defined position of the header includes a byte count. The sink can extract the byte count to establish the end of the first packet. This may then be repeated for each subsequent packet.

As described, the transmitter operates such that certain non-payload data, specifically, an end of transmission bit stream, follows the last packet of a transmission. This non-payload data could additionally comprise, for example, certain control information not intended for the data sink 24. One mechanism to ensure the data sink does not mistake this non-payload data as payload-bearing packets is as follows. Where the header of each payload-bearing packet includes a byte count, the data sink (or the lane merger 54, or any component between the lane merger and the data sink) will recognise the end of each packet. The bytes after the last payload-bearing packet may be expected to be recognised as not comprising a valid packet header. As such, the data sink will recognise the end of the stream of payload-bearing packets. In consequence, after recognising the end of the last payload-bearing packet, the data sink will simply ignore (or drop) any bytes that follow this.

The data sink could be a separate device or integrated with the receiver. If integrated with the receiver, the data sink could be a hardware, firmware, or software construct. Similarly, the data source could be a separate device or integrated with the transmitter. If integrated with the transmitter, the data source could be a hardware, firmware, or software construct.

While the example embodiment shows four data lanes, of course a system may equally have a different number of data lanes. Also, while the example cyclical pattern was an ascending sequence of the ordinal indicators for active data lanes, equally a different cyclical pattern could be used. All that is required is that the same cyclical pattern be used at both the transmitter and the receiver.

While the control path 42 has been shown as a path which is separate from the data lanes, alternatively, a data lane could be used to implement the control path. Specifically, a given data lane could be designated for use in sending control information and such information could be sent after the end of a transmission. Thus, after the end of a transmission, the transmit controller could activate the designated data lane and send this control information to the receiver so that the receiver activates the appropriate data lanes for the next transmission.

Other modifications will be apparent to those skilled in the art and, therefore, the invention is defined in the claims.

What is claimed is:

1. A method of handling data, comprising:
   at a transmitter:
     maintaining a plurality of transmitter data lane controllers in a power conservation state;
     receiving a bandwidth request for a transmission;
     based on said bandwidth request, selecting which of said plurality of data lanes are active data lanes for said transmission;
     waking up transmitter data lane controllers for said active data lanes;
     obtaining a pre-defined repeating sequence of said active data lanes;
     for each active data lane, receiving data words and timing said words through a buffer associated with said each active data lane;
     distributing words onto said active data lanes from said each buffer in said pre-defined repeating sequence of said active data lanes;
     sending an indication of said active data lanes toward a receiver;
   at said receiver:
     maintaining a plurality of receive data lane controllers in a power conservation state;
     receiving said indication of which of said plurality of data lanes are active data lanes;
     waking up receive data lane controllers for said active data lanes for said transmission;
     obtaining said pre-defined repeating sequence of said active data lanes;
     for each active data lane, receiving data words of said transmission and timing said words through a buffer associated with said each active data lane;
     merging words onto a parallel bus from said each buffer in said pre-defined repeating sequence of said active data lanes; and
     after an end of said returning said data lane controllers to said power conservation state.

2. The method of claim 1 wherein each of said plurality of data lanes has an ordinal signifier and wherein said pre-defined repeating sequence comprises an ascending sequence of ordinal signifiers for each of said active data lanes.

3. The method of claim 1 wherein said obtaining a pre-defined repeating sequence of data lanes comprises:
   selecting said pre-defined repeating sequence of data lanes based on said indication of which of said data lanes are active data lanes for said transmission.

4. The method of claim 1 further comprising passing any received end of transmission indicator on a data lane.

5. The method of claim 4 further comprising, during or after said merging, reading selected data words in order to identify an end of a last packet of said transmission.

6. The method of claim 1 further comprising refraining from said merging until a head of each said associated buffer for said active data lanes has a data word.

7. The method of claim 1 wherein said active data lanes comprise three data lanes and wherein said timing comprises:
   timing first data words from a first data lane through a first buffer;
   timing second data words from a second data lane through a second buffer; and
   timing third data words from a third data lane through a third buffer.

8. The method of claim 7 wherein said repeating sequence comprises said first data lane, said second data lane, and said third data lane.

9. The method of claim 1 wherein said active data lanes comprise four data lanes and wherein said timing comprises:
   timing first data words from a first data lane through a first buffer;
   timing second data words from a second data lane through a second buffer;
   timing third data words from a third data lane through a third buffer; and
   timing data words from a fourth data lane through a fourth buffer.

10. The method of claim 9 wherein said repeating sequence comprises said first data lane, said second data lane, said third data lane, and said fourth data lane.

11. The method of claim 1 wherein said data words are data bytes.

12. The method of claim 1 wherein said transmission is a first transmission and said indication is a first indication and further comprising:
receiving a second indication of which of said data lanes are active data lanes for a second transmission, said second indication indicating a different number of data lanes than for said first transmission;
waking up data lane controllers for said active data lanes for said second transmission;
obtaining a pre-defined repeating sequence of said active data lanes for said second transmission;
for each active data lane for said second transmission, receiving data words of said second transmission and timing said words of said second transmission through a buffer associated with said each active data lane for said second transmission;
merging words of said second transmission onto said parallel bus from each buffer associated with said each active data lane for said second transmission in said pre-defined repeating sequence of said active data lanes for said second transmission; and
after an end of said second transmission, returning said data lane controllers for said active data lanes for said second transmission to said power conservation state.

13. The method of claim 1 wherein said returning said active data lane controllers to said power conservation state is responsive to sensing a transition of said active data lanes to said power conservation state.

14. The method of claim 1 further comprising sending an indication of said pre-defined repeating sequence of said active data lanes toward said receiver.

15. The method of claim 14 further comprising, after an end of said transmission, sending an indication to return receiver data lane controllers to said power conservation state toward said receiver.

16. A system for handling data comprising:
a transmitter comprising:
a lane distributor input from a first parallel bus;
a plurality of transmitter buffers input by said lane distributor;
for each transmitter buffer, an associated transmitter data lane controller input by said each transmitter buffer, each transmitter data lane controller for outputting to one data lane of a plurality of serial data lanes;
a transmitter clock for timing any data words in any said transmitter buffer through said transmitter buffer;
a transmit controller operatively connected to said lane distributor for: maintaining each said transmitter data lane controller in a power conservation state; receiving a bandwidth request for a transmission; based on said bandwidth request, selecting which of said plurality of data lanes are active data lanes for said transmission; waking up transmitter data lane controllers for said active data lanes; obtaining a pre-defined repeating sequence of said active data lanes; for each active data lane, receiving data words and timing said words through a buffer associated with said each active data lane; distributing words onto said active data lanes from said each transmit buffer in said pre-defined repeating sequence of said active data lanes; and sending an indication of said active data lanes toward a receiver;
said receiver, comprising:
a receiver data lane controller for terminating each of said plurality of serial data lanes;
a receiver buffer associated with each said receiver data lane controller;
a lane merger associated with an output of each said receiver buffer for inputting a second parallel data bus;
a receiver clock for timing any data words in any said receiver buffer through said receiver buffer;
a receive controller operatively connected to each said receiver data lane controller, each said receiver buffer, and said lane merger for maintaining each said receive data lane controller in a power conservation state; receiving said indication of which of said plurality of data lanes are active data lanes for said transmission; waking up receive data lane controllers for said active data lanes; obtaining said pre-defined repeating sequence of said active data lanes; for each active data lane, receiving data words and timing said words through a buffer associated with said each active data lane; merging words onto a parallel bus from each buffer in said pre-defined repeating sequence of said active data lanes; and after an end of said transmission, returning said receive data lane controllers to said power conservation state.

17. The system of claim 16 further comprising a control path between said transmit controller and said receive controller and wherein said transmit controller sends said indication of said active data lanes on said control path.

18. A transmitter, comprising:
a lane distributor input from a first parallel bus;
a plurality of transmitter buffers input by said lane distributor;
for each transmitter buffer, an associated transmitter data lane controller input by said each transmitter buffer, each transmitter data lane controller for outputting to one data lane of a plurality of serial data lanes;
a transmitter clock for timing any data words in any said transmitter buffer through said transmitter buffer;
a transmit controller operatively connected to said lane distributor for: maintaining each said transmitter data lane controller in a power conservation state; receiving a bandwidth request for a transmission; based on said bandwidth request, selecting which of said plurality of data lanes are active data lanes for said transmission; waking up transmitter data lane controllers for said active data lanes; obtaining a pre-defined repeating sequence of said active data lanes; for each active data lane, receiving data words and timing said words through a buffer associated with said each active data lane; distributing words onto said active data lanes from said each transmit buffer in said pre-defined repeating sequence of said active data lanes; and sending an indication of said active data lanes toward a receiver.

* * * * *